No. 757,969. PATENTED APR. 19, 1904.
A. SCHOELLHORN & H. S. ALBRECHT.
PULVERIZING MACHINE.
APPLICATION FILED APR. 13, 1903.
NO MODEL. 2 SHEETS—SHEET 1.
Fig. I.
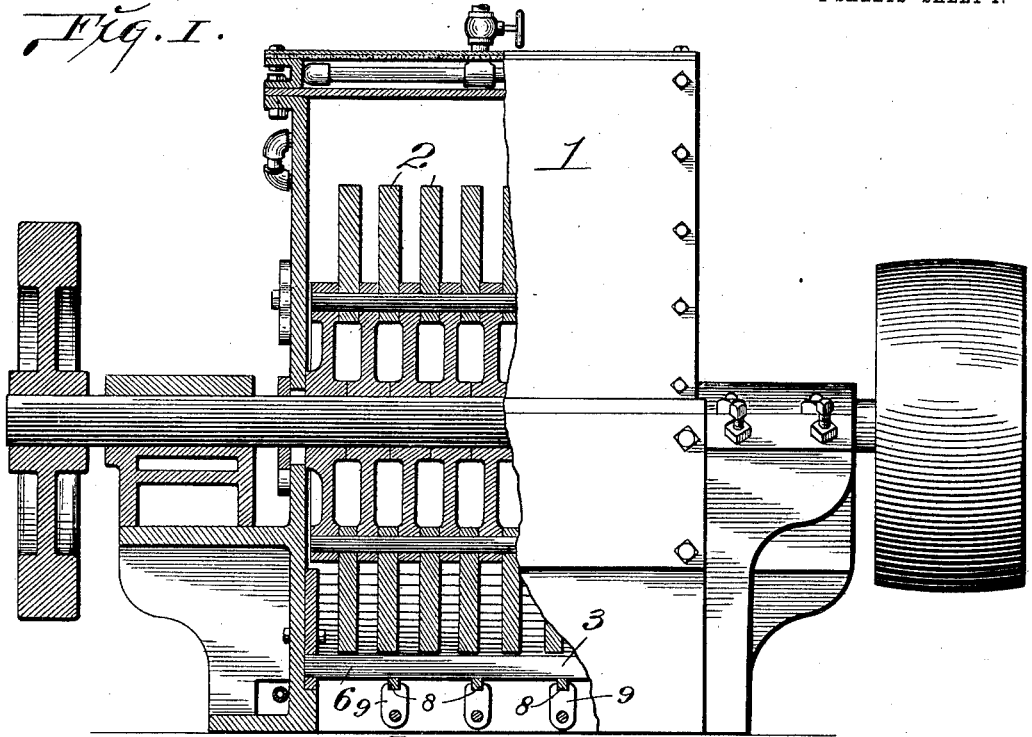
Fig. II.
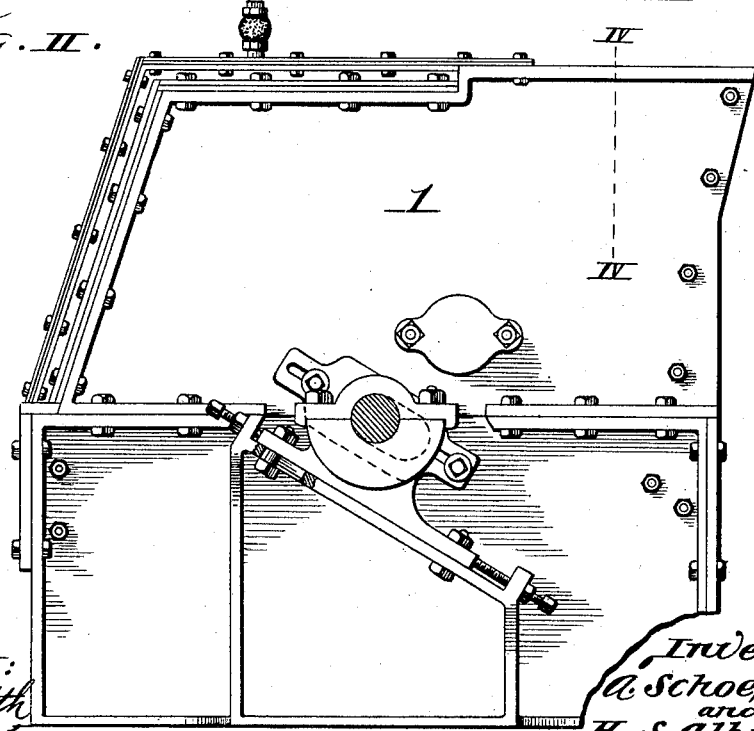
Attest:
M. Smith
F. Knight
Inventors,
A. Schoellhorn,
and
H. S. Albrecht.
By Knight Bros.
Attys.

No. 757,969. PATENTED APR. 19, 1904.
A. SCHOELLHORN & H. S. ALBRECHT.
PULVERIZING MACHINE.
APPLICATION FILED APR. 13, 1903.
NO MODEL. 2 SHEETS—SHEET 2.
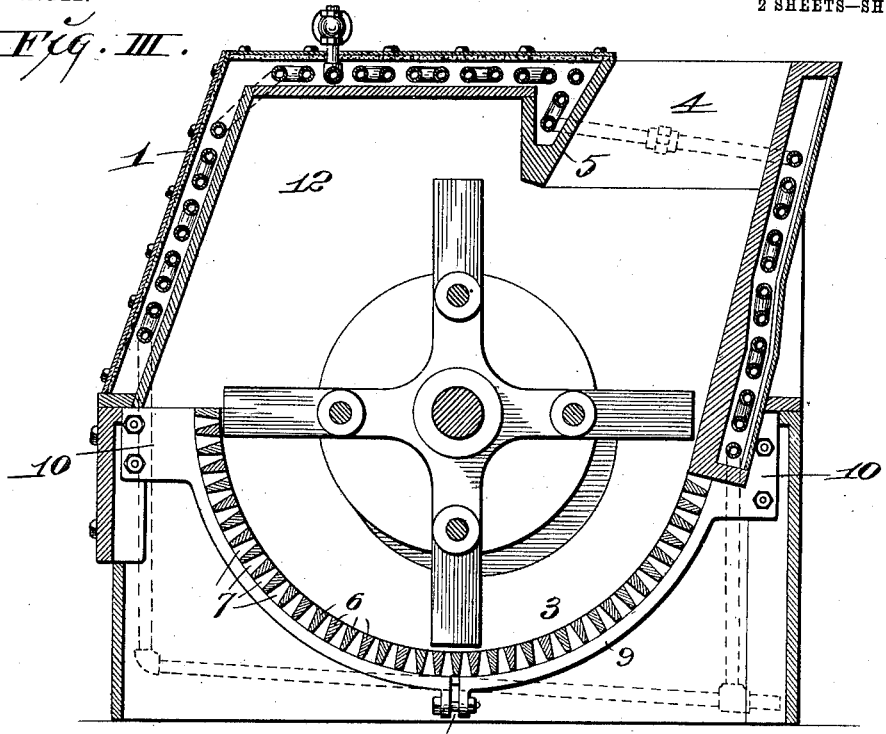
Fig. III.
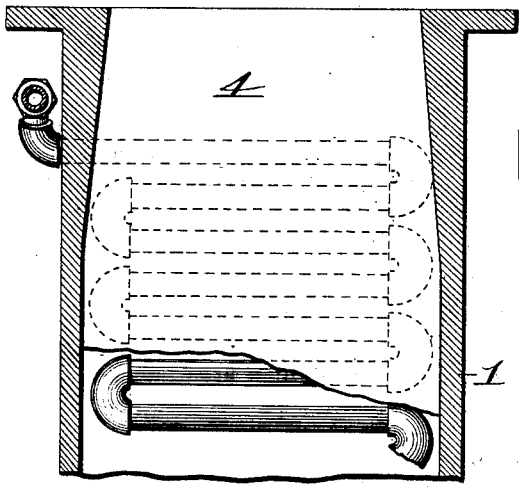
Fig. IV.
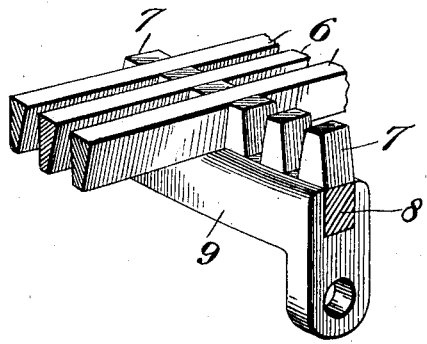
Fig. V.
attest:
M. P. Smith
E. S. Knight
Inventors:
August Schoellhorn,
and H. S. Albrecht,
By Knight Bro.
atty's No. 757,969. Patented April 19, 1904.

UNITED STATES PATENT OFFICE.

AUGUST SCHOELLHORN AND HERMAN S. ALBRECHT, OF ST. LOUIS, MISSOURI.

PULVERIZING-MACHINE.

SPECIFICATION forming part of Letters Patent No. 757,969, dated April 19, 1904.

Application filed April 13, 1903. Serial No. 152,310. (No model.)

*To all whom it may concern:*

Be it known that we, AUGUST SCHOELLHORN and HERMAN S. ALBRECHT, citizens of the United States, residing in the city of St. Louis, in the State of Missouri, have invented certain new and useful Improvements in Pulverizing-Machines, of which the following is a full, clear, and exact description, reference being had to the accompanying drawings, forming part of this specification.

This machine is designed to be used for the purpose of pulverizing clay, shale, and other materials.

The object of our invention is to provide a machine of this character with an improved form of grate-support and to further so construct the machine that the material acted upon will have a space into which it can enter and fall back into the lower part of the machine without being carried around by the beater to the feed side of the machine.

Our invention consists in features of novelty hereinafter fully described, and pointed out in the claims.

Figure I is a rear view of our improved machine, part in vertical section. Fig. II is a side view. Fig. III is a vertical section. Fig. IV is an enlarged detail vertical section taken on line IV IV, Fig. II. Fig. V is a detail perspective view of the grate.

Referring to the drawings, 1 represents the housing of the machine, 2 the beater, and 3 the grate. The housing is provided at the front of the machine with a feed-opening 4, the back or inner wall of which is formed by a casting 5, that extends down a distance into the interior or chamber of the machine, terminating sufficiently high, however, as not to be struck by the arms of the beater.

The grate 3 is composed of grate-bars 6, that fit between projections or teeth 7, extending upwardly from semicircular bars 8, that are seated in grooves formed in semicircular supporting-bands 9. Each band 9 (there may be any desired number of them; we have shown four in Fig. I) is composed of two sections, having their outer ends secured to the housing of the machine at 10 and having their inner ends bolted together at 11. By thus supporting the grate it can be readily removed and renewed by simply taking out the supporting-bands, and an additional advantage lies in the fact that provision is made for a slight vertical adjustment of the grate by tightening up or loosening the bolts 11, there being sufficient spring in the metal of the bands to allow for this adjustment.

In pulverizing many kinds of material it is desirable to allow the pulverized particles to fall back into the machine without being carried over past the feed-opening. To accomplish this, we so construct the housing of the machine as to provide a chamber or space 12 behind and above the beater and the front upper portion of which is cut off by the casting 5, so that the pulverized particles thrown rearwardly and upwardly by the action of the beater will fall back into the machine at the rear thereof and not be carried forwardly across the path of the feed-opening.

We claim as our invention—

1. In a pulverizer, the combination with the rotary beater, of a grate disposed beneath the beater, and composed of semicircular supporting-bands secured by their ends to the casing, divided intermediate of their ends, and grooved in their tops, semicircular bars fitted within the grooves of the semicircular supporting-band; provided with upwardly-projecting teeth, grate-bars extending transversely of the supporting-bands, and fitted between the teeth of the semicircular bars, and means for adjusting the adjacent ends of the sections of the semicircular bands toward one another.

2. In a pulverizer, the combination with a rotary beater, of a grate disposed beneath the beater, and composed of semicircular bands secured at their ends to the casing and divided intermediate of their ends, means for adjusting the adjacent ends of the sections of the semicircular bands toward one another, semicircular bars supported on the bands and provided with upwardly-extending teeth, and grate-bars extending transversely of the bars and resting between the teeth.

AUGUST SCHOELLHORN.
HERMAN S. ALBRECHT.

In presence of—
NELLIE V. ALEXANDER,
E. S. KNIGHT.